July 23, 1940. W. H. GILLE 2,208,560
AUTOMATIC RESET MECHANISM
Filed Nov. 23, 1936
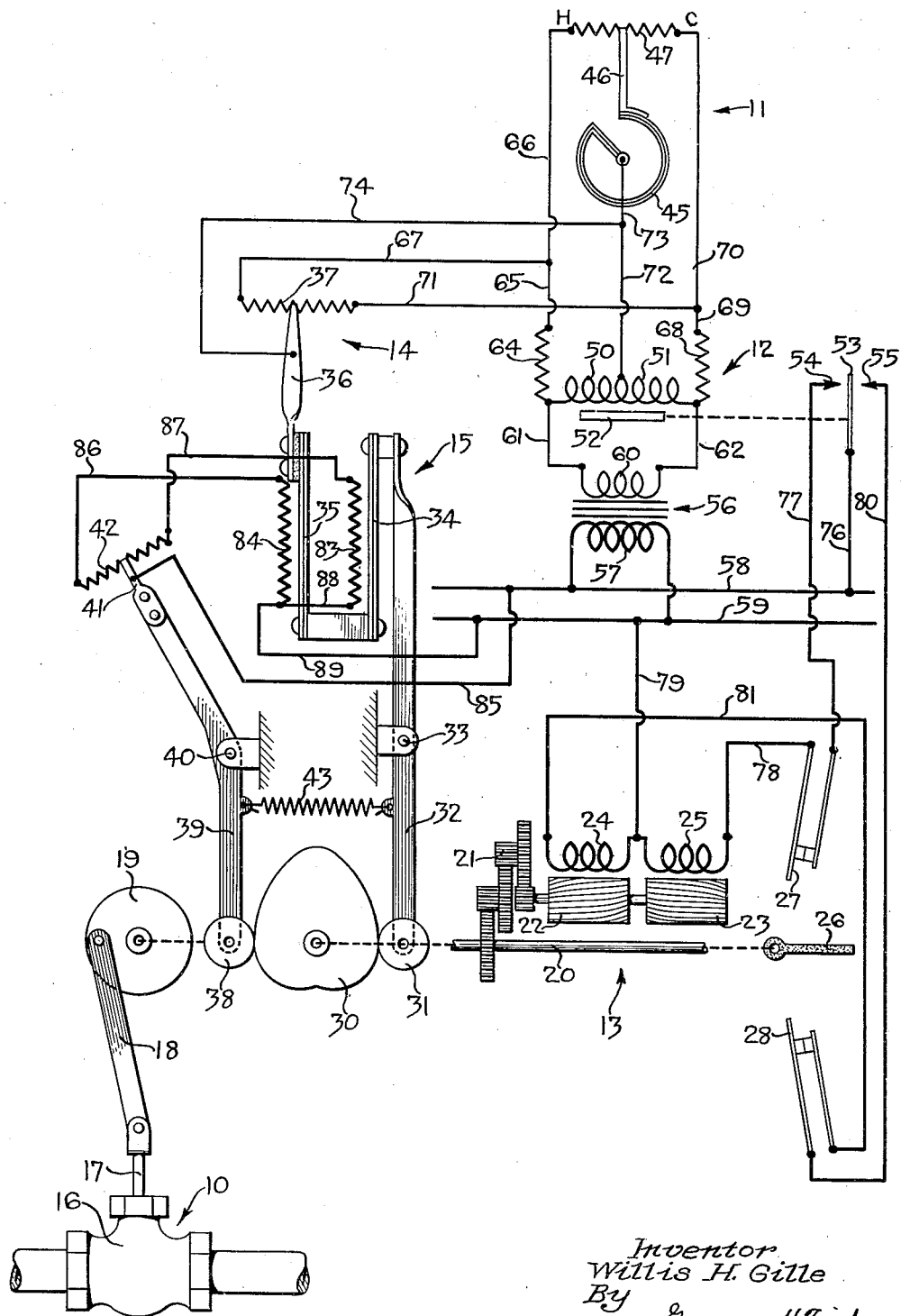
Inventor
Willis H. Gille
By
George H Fisher
Attorney Patented July 23, 1940

2,208,560

UNITED STATES PATENT OFFICE 2,208,560

AUTOMATIC RESET MECHANISM

Willis H. Gille, St. Paul, Minn., assignor to Minneapolis-Honeywell Regulator Company, Minneapolis, Minn., a corporation of Delaware Application November 23, 1936, Serial No. 112,328

8 Claims. (Cl. 236—78)

This invention relates to automatic reset or load compensation mechanism and particularly to that type of mechanism as applied to a follow-up control system.

It is an object of this invention to provide a follow-up control system for controlling the value of a condition along with a novel automatic reset or load compensation mechanism for maintaining the value of the condition to be controlled at a substantially constant value regardless of changes in load.

A further object of this invention is to provide a new and novel combined follow-up and load compensation mechanism wherein a thermo-electrically operated reset mechanism alters the operation of the follow-up means.

Other objects and advantages will become apparent to those skilled in the art upon reference to the accompanying specification, claims and drawing.

For a more thorough understanding of this invention reference is made to the accompanying single sheet of drawings in which is diagrammatically disclosed the preferred form of my invention.

Referring now to Figure 1, a device to be positioned in a plurality of positions for controlling the value of a condition is generally designated at 10. Control means, the state of which is varied in accordance with changes in the value of the condition, is generally designated at 11. The control means 11 controls a relay generally designated at 12 which in turn controls the operation of a motor generally designated at 13. The motor 13 positions the device 10 in a plurality of positions and also operates a follow-up means generally designated at 14. The follow-up means 14 performs a balancing function for the relay generally designated at 12. A reset or load compensation mechanism generally designated at 15 alters the action of the follow-up means 14 for maintaining the value of the condition to be controlled at the desired normal value regardless of changes in load.

Although the control system of this invention may be used for controlling any desired condition it is shown for purposes of illustration as controlling a temperature condition and more particularly the temperature of a space, not shown. Therefore, the device 10 which is positioned in a plurality of positions is shown to be a valve 16 for controlling the supply of heating fluid to the space. The valve 16 may be operated by a valve stem 17 which is connected by a pitman 18 to a crank disc 19 carried by a shaft 20 of the motor 13. The shaft 20 is operated through a reduction gear train 21 by motor rotors 22 and 23. The motor rotors 22 and 23 are in turn operated by field windings 24 and 25, the arrangement being such that when the field winding 25 is energized the valve 16 is moved towards an open position and when the field winding 24 is energized the valve 16 is moved towards a closed position.

The shaft 20 also operates an abutment member 26 preferably made of insulating material for opening limit switches 27 and 28 when the valve 16 is moved to a complete open position or a complete closed position respectively. The shaft 20 also operates a double lobed straight line cam 30. One lobe of the cam 30 is engaged by a cam follower 31 carried by a lever 32 pivoted intermediate its length on a stationary pivot 33. The other end of the lever 32 has secured thereto one end of a bimetallic element 34. The other end of the bimetallic element 34 is secured to one end of a second bimetallic element 35. The other end of the second bimetallic element 35 carries by means of an insulating pad a slider 36 which is adapted to slide across a potentiometer resistance element 37. The slider 36 and the resistance element 37 form a balancing potentiometer for rebalancing the relay 12 in a manner to be pointed out more fully hereafter. The other lobe of the cam 30 is engaged by a cam follower 38 carried by a lever 39. Lever 39 is pivoted intermediate its length on a stationary pivot 40 and the other end of the lever 39 carries by means of an insulating pad, not shown, a slider 41 which is adapted to slide across a resistance element 42. The cam followers 31 and 38 are held in engagement with the cam 30 by means of a spring 43. When the motor 13 operates the valve 16 towards an open position the cam 30 is rotated in a clockwise direction to move the sliders 36 and 41 to the left and when the valve 16 is moved towards a closed position the sliders 36 and 41 are moved toward the right.

The control means generally designated at 11 is shown to be a thermostatic control means having a thermostatic element 45 responsive to variations in space temperature. The thermostatic element 45 operates a slider 46 with respect to a potentiometer resistance element 47. The slider 46 and the resistance element 47 comprise a control potentiometer for influencing the action of the relay 12. Upon an increase in space temperature the slider 46 is moved to the left in the direction indicated by the character H and upon a decrease in space temperature the slider 46 is moved to the right in the direction indicated by the character C. When the space temperature is at the desired normal value the slider 46 is in a mid-position as shown in the drawing and this represents the normal state of the control means.

The relay generally designated at 12 may comprise relay coils 50 and 51 which influences an armature 52 which is suitably connected to a switch arm 53. The switch arm 53 is adapted to engage spaced contacts 54 and 55. When the relay coil 50 is energized more than the relay coil 51 the switch arm 53 is moved into engagement with the contact 54 and when the relay coil 51 is energized more than the relay coil 50 the switch arm 53 is moved into engagement with the contact 55. When the relay coils 50 and 51 are equally energized the switch arm 53 is spaced midway between the contacts 54 and 55 as shown in the drawing. Power is supplied to the relay 12 by means of a step-down transformer 56 having a primary 57 connected across line wires 58 and 59 and a secondary 60. One end of the secondary 60 is connected by a wire 61 to the left end of the relay coil 50 and the other end of the secondary 60 is connected by a wire 62 to the right end of the relay coil 51. The adjacent ends of the relay coils 50 and 51 are connected together. By reason of these connections it is seen that the relay coils 50 and 51 are connected in series and across the secondary 60.

The left end of the relay coil 50 is connected by a protective resistance 64 and wires 65, 66 and 67 to the left ends of the control potentiometer resistance element 47 and the balancing potentiometer resistance element 37. In a like manner, the right end of the relay coil 51 is connected by a protective resistance 68 and wires 69, 70 and 71 to the right ends of the control potentiometer resistance element 47 and the balancing potentiometer resistance element 37. The junction of the relay coils 50 and 51 are connected by wires 72, 73 and 74 to the slider 46 of the control potentiometer and to the slider 36 of the balancing potentiometer. By reason of these wiring connections the control potentiometer and the balancing potentiometer are connected in parallel with the series connected coils 50 and 51 and across the secondary 60.

Omitting for the present the action of the bimetallic elements 34 and 35, it is assumed that the space temperature is at the desired normal value, that the valve 16 is in a mid-position, that the slider 36 of the balancing potentiometer is in a mid-position and that just the correct amount of heat is being supplied to the space to make up for the heat losses from the space or the heating load on the heating system. The parts are then in the position shown in the drawing. Upon an increase in heating load the space temperature decreases and the slider 46 of the control potentiometer is moved to the right and by reason of the parallel relationship pointed out above this right-hand movement causes partial short-circuiting of the relay coil 51 to decrease the energization thereof and to increase the energization of the relay coil 50. This causes movement of the switcharm 53 into engagement with the contact 54 to complete a circuit from the line wire 58, through wire 76, switch arm 53, contact 54, wire 77, limit switch 27, wire 78, field winding 25 and wire 79 back to the other line wire 59. Completion of this circuit energizes the field winding 25 to move the valve 16 towards an open position. Operation of the motor 13 to move the valve 16 towards an open position causes left-hand movement of the slider 36 of the balancing potentiometer. This left-hand movement of the slider 36 causes partial short-circuiting of the relay coil 50 to decrease the energization thereof and to increase the energization of the relay coil 51. When the relay coil 51 has moved sufficiently far to the left to rebalance the energizations of the relay coils 50 and 51 the switch arm 53 is moved out of engagement with the contact 54 and the valve 16 is maintained in its newly adjusted position. In this manner the valve 16 is moved towards an open position in direct accordance with the amount of decrease in space temperature to supply additional heat to the space.

Upon a decrease in heating load the space temperature increases to move the slider 36 to the left in the direction indicated by the character H. This causes partial short-circuiting of the relay coil 50 to decrease the energization thereof and to increase the energization of the relay coil 51. As a result of these unequal energizations of the relay coils 50 and 51 the switch arm 53 is moved into engagement with the contact 55 to complete a circuit from the line wire 58 through wire 76, switch arm 53, contact 55, wire 80, limit switch 28, wire 81, field winding 24, and wire 79 back to the other line wire 59. Completion of this circuit energizes the field winding 24 to move the valve 16 towards a closed position. Operation of the motor 13 to move the valve 16 towards a closed position causes right-hand movement of the slider 36 of the balancing potentiometer. This right-hand movement of the slider 36 partially short-circuits the relay coil 51 to decrease the energization thereof and to increase the energization of the relay coil 50. When the slider 36 has moved sufficiently far to the right to rebalance the energizations of the relay coils 50 and 51 the switch arm 53 is moved out of engagement with the contact 55 to stop further closing movement of the valve 16. In this manner the valve 16 is moved towards a closed position in direct accordance with the amount of increase in space temperature to decrease the supply of heat to the space.

By reason of the above follow-up control system the valve 16 is modulated in either direction upon a deviation in space temperature from the desired normal value and the amount that the valve 16 is so modulated is dependent upon the amount of deviation of the space temperature. Such a control system gives fairly satisfactory results but if the control range of the control potentiometer is made sufficiently narrow to insure accurate temperature control "hunting" is likely to occur. If the control range of the control potentiometer is widened a condition which is commonly termed a "drooping" characteristic is likely to occur. That is, when the heating load on the system is relatively great the space temperature is maintained at a lower value than when the heating load is relatively light. In order to eliminate "hunting" and to eliminate the inherent "drooping" characteristic of a follow-up control system, the reset mechanism generally designated at 15 is utilized. By reason of this reset mechanism the space temperature is maintained at a substantially constant value regardless of changes in load.

The thermostatic elements 34 and 35 form part of the reset mechanism 15. These thermostatic elements 34 and 35 are heated by heaters 83 and 84 respectively and the energizations of the heaters 83 and 84 are controlled by the resistance element 42 and the slider 41 operated by the motor 13. The line wire 58 is connected by a wire 85 to the slider 41. The left-hand end of the resistance element 42 is connected by a wire 86 to the upper end of the heater 84 and the right-hand end of the resistance element 42 is connected by a wire 87 to the upper end of the heater 83. The other ends of the heaters 84 and 83 are connected together by a wire 88 and by a wire 89 to the line wire 59. By reason of these connections it is seen that when the slider 41 is in a mid-position with respect to the resistance element 42 the heaters 83 and 84 are equally energized and the slider 36 is in a mid-position. Movement of the slider 41 to the left increases the energization of the heater 84 and decreases the energization of the heater 83. These unequal energizations of the heaters 83 and 84 cause the slider 36 of the balancing potentiometer to be moved toward the right. Movement of the slider 41 to the right with respect to the resistance element 42 increases the energization of the heater 83 and decreases the energization of the heater 84 to move the slider 36 of the balancing potentiometer towards the left. Since it takes an interval of time to cause flexing of the thermostatic elements 34 and 35 following a change in the energizations of the heating elements 83 and 84, the slider 36 is moved by the thermostatic elements 34 and 35 after the lapse of a time interval following a change in the energizations of the heaters 83 and 84.

Assume now the parts in the position shown in the drawing, an increase in heating load causes a decrease in space temperature to move the slider 46 of the control potentiometer to the right. This partially short-circuits the relay coil 51 to move the switch arm 53 into engagement with the contact 54. The valve 16 is moved towards an open position and the slider 36 of the balancing potentiometer is moved to the left to rebalance the relay 12 whereby the valve 16 is moved towards an open position in an amount corresponding to the decrease in space temperature. Operation of the motor 13 to move the valve 16 towards an open position also causes movement of the slider 41 to the left and this increases the energization of the heater 84 and decreases the energization of the heater 83, and as a result of these unequal energizations the slider 36 of the balancing potentiometer is moved back towards the mid-position. This causes partial short-circuiting of the relay coil 51 to again move the switch arm 53 into engagement with the contact 54. The valve 16 is thereupon moved further towards an open position and the slider 41 is moved further towards the left and as long as the space temperature is less than the desired normal value the valve 16 will be inched towards an open position in this manner. When the space temperature is restored to the desired normal value by reason of this additional opening of the valve 16 the relay 12 will become balanced and the valve 16 will be positioned or reset in a new position with respect to the position of the slider 46 of the control potentiometer. This new position is in accordance with the increased load on the heating system.

Upon a decrease in heating load the space temperature increases to move the slider 46 of the control potentiometer to the left. This partially short-circuits the relay coil 50 to move the switch arm 53 into engagement with the contact 55 whereupon the valve 16 is moved towards a closed position and the slider 36 of the balancing potentiometer is moved towards the right. In this manner the valve 16 is moved towards a closed position corresponding to the amount of increase in the space temperature. Operation of the motor 13 to move the valve 16 towards a closed position causes right-hand movement of the slider 41 to increase the energization of the heater 83 and decrease the energization of the heater 84. This causes movement of the slider 36 of the balancing potentiometer to the left towards the mid-position and this left-hand movement of the slider 36 partially short-circuits the relay coil 50 to again move the valve 16 towards a closed position. Movement of the valve 16 further towards a closed position again causes right-hand movement of the slider 41 to further increase the energization of the heater 83 and decrease the energization of the heater 84 which moves the slider 36 again towards the mid-position. In this manner the valve 16 is inched toward a closed position in accordance with the decrease in heating load.

By reason of the above control system the valve 16 is modulated by the follow-up system in accordance with the amount of deviation of the space temperature and is further moved towards either an open position or a closed position in accordance with changes in load causing the deviation in space temperature. By reason of this additional movement of the valve 16 changes in load are compensated for and the space temperature is maintained at the desired normal value regardless of changes in load. The time delay between the change in the energizations of the heaters 83 and 84 and their effect on the thermostatic elements 34 and 35 make possible this mode of operation and if this time delay is properly selected the space temperature will be maintained at the desired value regardless of changes in loan and without "hunting."

Although for purposes of illustration I have shown one form of my invention, other forms thereof may become obvious to those skilled in the art upon reference to this specification, and therefore this invention is to be limited only by the scope of the appended claims and prior art.

I claim as my invention:

1. In combination, a device to be positioned in a plurality of positions for controlling the value of a condition, control means the state of which is varied in accordance with changes in the value of the condition and having a normal state corresponding to a desired normal value of the condition, means, including a follow-up means operated by said device, controlled by said control means for positioning said device in accordance with changes in the value of the condition to be controlled, said follow-up means including a relatively stationary member and a movable member, means connecting the movable member with said device for operation thereby, and thermo-electric means included in said connecting means and operative as an incident to deviation of the value of the condition to be controlled from the desired normal value for also operating the movable member to return the value of the condition to be controlled toward the desired normal value.

2. In combination, a device to be positioned in a plurality of positions for controlling the value of a condition, control means the state of which is varied in accordance with changes in the value of the condition and having a normal state corresponding to a desired normal value of the condition, means, including follow-up means operated by said device, controlled by said control means for positioning said device in accordance with changes in the value of the condition to be controlled, said follow-up means including a relatively stationary member and a movable member, means connecting the movable member with said device for operation thereby, and thermoelectric means included in said connecting means and also operated by said device for also operating the movable member to position said device differently with respect to the value of the condition to be controlled.

3. In combination, a device to be positioned in a plurality of positions for controlling the value of a condition, control means the state of which is varied in accordance with changes in the value of the condition and having a normal state corresponding to a desired normal value of the condition, means, including follow-up means operated by said device, controlled by said control means for positioning said device in accordance with changes in the value of the condition to be controlled, said follow-up means including a relatively stationary member and a movable member, means connecting the movable member with said device for operation thereby, thermostatic means in said connecting means for altering the operation of the movable member by the device, heating means for the thermostatic means, and means operative as an incident to deviation of the value of the condition to be controlled from the desired normal value for varying the heating effect of the heating means to position said device for returning the value of the condition to be controlled toward the desired normal value.

4. In combination, a device to be positioned in a plurality of positions for controlling the value of a condition, control means the state of which is varied in accordance with changes in the value of the condition and having a normal state corresponding to a desired normal value of the condition, means including follow-up means operated by said device, controlled by said control means for positioning said device in accordance with changes in the value of the condition to be controlled, said follow-up means including a relatively stationary member and a movable member, means connecting the movable member with said device for operation thereby, thermostatic means in said connecting means for altering the operation of the movable member by the device, heating means for the thermostatic means, and means controlled by said device for varying the heating effect of the heating means to position said device differently with respect to the value of the condition to be controlled.

5. In combination, a device to be positioned in a plurality of positions to control the value of a condition, control impedance means, means responsive to variations in the value of the condition to be controlled for adjusting the control impedance means, relay means in control of the device, balancing impedance means including a relatively stationary member and a movable member, connecting means between the movable member and the device for adjusting the balancing impedance means upon operation of the device, connections between the control impedance means, the balancing impedance means and the relay means, thermo-electric means included in said connecting means for also operating the movable member, and means operative as an incident to deviation of the value of the condition to be controlled from the desired normal value for controlling the thermo-electric means.

6. In combination, a device to be positioned in a plurality of positions to control the value of a condition, control impedance means, means responsive to variations in the value of the condition to be controlled for adjusting the control impedance means, relay means in control of the device, balancing impedance means including a relatively stationary member and a movable member, connecting means between the movable member and the device for adjusting the balancing impedance means upon operation of the device, connections between the control impedance means, the balancing impedance means and the relay means, thermostatic means included in said connecting means for also operating the movable member, heating means for the thermostatic means, and means controlled by said device for varying the heating effect of the heating means.

7. A combined reset and follow-up mechanism for a device which controls the value of a condition comprising in combination, a member, an element movable with respect to the member for performing the control function, thermostatic means supporting said element, means operated by said device for operating the thermostatic means and consequently the element, heating means for the thermostatic means, and means for varying the heating effect of the heating means.

8. A combined reset and follow-up mechanism for a device which controls the value of a condition comprising in combination, a member, an element movable with respect to the member for performing the control function, a pair of oppositely arranged thermostatic elements for operating the movable element, means operated by the device for operating the thermostatic elements and consequently the movable element, a heater for each thermostatic element, and adjustable resistance means in control of said heaters for varying the heating effect thereof, the arrangement being such that when the heating effect of one is increased the heating effect of the other is decreased.

WILLIS H. GILLE.